United States Patent
Montmorillon et al.

(10) Patent No.: US 7,171,092 B2
(45) Date of Patent: *Jan. 30, 2007

(54) OPTICAL FIBER WITH CHROMATIC DISPERSION COMPENSATION IN THE S BAND

(75) Inventors: Louis-Anne de Montmorillon, Paris (FR); Ludovic Fleury, Bois d'Arcy (FR); Pierre Sillard, Le Chesnay (FR); Florent Beaumont, Conflans Ste Honorine (FR); Maxime Gorlier, Paris (FR); Denis Molin, Le Chesnay (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 300 days.

This patent is subject to a terminal disclaimer.

(21) Appl. No.: 10/737,893

(22) Filed: Dec. 18, 2003

(65) Prior Publication Data
US 2004/0213533 A1    Oct. 28, 2004

(30) Foreign Application Priority Data
Dec. 24, 2002    (FR) .................................. 02 16616

(51) Int. Cl.
*G02B 6/36*    (2006.01)
(52) U.S. Cl. ...................... 385/127; 385/123; 385/126

(58) Field of Classification Search ......... 385/123–127
See application file for complete search history.

(56) References Cited

U.S. PATENT DOCUMENTS

| 6,895,153 B2 * | 5/2005 | De Montmorillon et al. .......................... 385/124 |
| 2001/0010746 A1 | 8/2001 | Kubo |
| 2002/0067903 A1 | 6/2002 | Fleury |

FOREIGN PATENT DOCUMENTS

| EP | 1 111 414 A2 | 6/2001 |
| EP | 1 219 986 A1 | 7/2002 |
| EP | 1 241 810 A2 | 9/2002 |
| WO | WO 02/19576 A2 | 3/2002 |

* cited by examiner

*Primary Examiner*—Jennifer Doan
(74) *Attorney, Agent, or Firm*—Sughrue Mion, PLLC

(57) ABSTRACT

The invention relates to the field of optical fibers for wavelength division multiplex transmission networks. It provides an optical fiber with chromatic dispersion compensation in the S band from 1 460 nm to 1 530 nm having a negative chromatic dispersion at the wavelength of 1 495 nm and at least three core slices, preferably at least four core slices. The single core slice or the first core slice is very deeply buried and preferably has as at the wavelength of 1 495 nm a chromatic dispersion to dispersion slope ratio whose absolute value is from 68 nm to 158 nm.

20 Claims, 3 Drawing Sheets

FIG_1
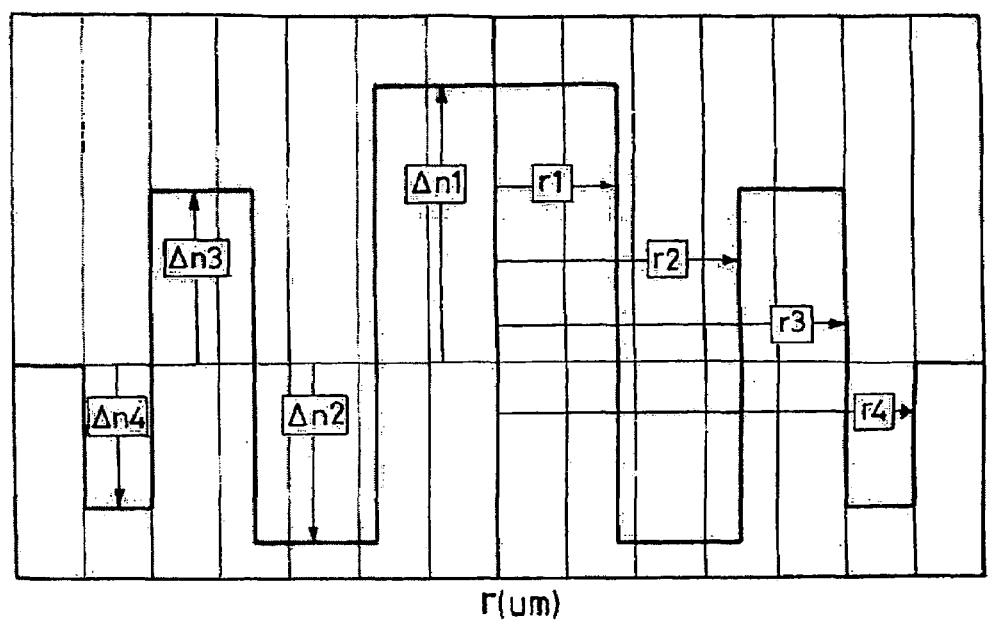

FIG_2

|   | $r_1$ (μm) | $r_2$ (μm) | $r_3$ (μm) | $10^3 \Delta n_1$ | $10^3 \Delta n_2$ | $10^3 \Delta n_3$ |
|---|---|---|---|---|---|---|
| 1 | 1,65 | 5,57 | 7,90 | 19,12 | -7,72 | 5,87 |
| 2 | 1,64 | 5,73 | 7,66 | 19,45 | -7,85 | 7,21 |
| 3 | 1,79 | 5,27 | 7,46 | 17,43 | -8,73 | 6,18 |
| 4 | 1,69 | 5,49 | 7,43 | 19,51 | -9,70 | 7,37 |
| 5 | 1,96 | 5,48 | 7,93 | 15,85 | -8,70 | 5,65 |
| 6 | 2,05 | 5,95 | 7,91 | 14,54 | -7,96 | 6,72 |
| 7 | 2,36 | 5,81 | 8,42 | 12,18 | -7,82 | 4,53 |
| 8 | 2,43 | 6,04 | 7,77 | 11,86 | -7,87 | 7,46 |
| 9 | 2,33 | 5,67 | 7,44 | 13,06 | -9,47 | 6,63 |

FIG_3

|   | $S_{eff}$ μm² @1495nm | C ps/nm.km @1495nm | C' ps/nm².km @1495nm | C/C' nm @1495nm | Taux de compensation TeraLight Ultra (%) | Taux de compensation TeraLight (%) | $\lambda_{ch}$ μm | $PC_{1530}$ dB/m |
|---|---|---|---|---|---|---|---|---|
| 1 | 15 | -58,8 | -0,497 | 118 | 120 | 143 | 1,72 | 13,8 |
| 2 | 15 | -50,8 | -0,396 | 128 | 130 | 155 | 1,70 | 8,5 |
| 3 | 17 | -53,8 | -0,449 | 120 | 121 | 144 | 1,67 | 17,7 |
| 4 | 14 | -42,7 | -0,361 | 118 | 119 | 143 | 1,69 | 4,6 |
| 5 | 18 | -32,1 | -0,271 | 118 | 120 | 143 | 1,72 | 4,5 |
| 6 | 19 | -23,1 | -0,192 | 120 | 122 | 145 | 1,71 | 9,8 |
| 7 | 23 | -12,0 | -0,107 | 112 | 113 | 135 | 1,73 | 8,3 |
| 8 | 24 | -10,1 | -0,092 | 109 | 111 | 132 | 1,73 | 5,6 |
| 9 | 21 | -7,5 | -0,077 | 98 | 98 | 117 | 1,70 | 1,5 |

FIG_4

| N° | $S_{01}$ ($10^{-3}$ μm) | $T_{01}$ ($10^{-3}$ μm²) | $S_{12}$ ($10^{-3}$ μm) | $T_{12}$ ($10^{-3}$ μm²) | $S_{23}$ ($10^{-3}$ μm) | $T_{23}$ ($10^{-3}$ μm²) | $S_{03}$ ($10^{-3}$ μm) | $T_{03}$ ($10^{-3}$ μm²) | $U_{03}$ ($10^{-3}$ μm²) |
|---|---|---|---|---|---|---|---|---|---|
| MIN | 28 | 51 | -42 | -350 | 5 | 70 | 2,8 | -108 | 24,4 |
| MAX | 34 | 79 | -22 | -160 | 15 | 207 | 18,2 | 57 | 28,5 |
| 1 | 31,5 | 52,1 | -30,3 | -218,5 | 13,7 | 184,2 | 15,0 | 17,8 | 25,2 |
| 2 | 31,9 | 52,3 | -32,1 | -236,6 | 13,9 | 186,3 | 13,7 | 2,0 | 25,4 |
| 3 | 31,2 | 55,8 | -30,4 | -214,5 | 13,5 | 172,3 | 14,4 | 13,7 | 25,4 |
| 4 | 33,0 | 55,7 | -36,9 | -264,7 | 14,3 | 184,7 | 10,4 | -24,2 | 25,5 |
| 5 | 31,1 | 60,9 | -30,6 | -227,8 | 13,8 | 185,6 | 14,3 | 18,7 | 26,4 |
| 6 | 29,8 | 61,1 | -31,0 | -248,4 | 13,2 | 182,6 | 11,9 | -4,7 | 25,9 |
| 7 | 28,7 | 67,8 | -27,0 | -220,4 | 11,8 | 168,2 | 13,6 | 15,7 | 25,0 |
| 8 | 28,8 | 70,0 | -28,4 | -240,6 | 12,9 | 178,2 | 13,3 | 7,6 | 25,0 |
| 9 | 30,4 | 70,9 | -31,6 | -253,0 | 11,7 | 153,8 | 10,5 | -28,3 | 26,2 |

FIG_5

| N° | $r_1$ (µm) | $r_2$ (µm) | $r_3$ (µm) | $r_4$ (µm) | $10^3 \Delta n_1$ | $10^3 \Delta n_2$ | $10^3 \Delta n_3$ | $10^3 \Delta n_4$ |
|---|---|---|---|---|---|---|---|---|
| 10 | 2,11 | 6,61 | 9,78 | 12,43 | 14,11 | -7,00 | 7,00 | -7,00 |
| 11 | 2,01 | 5,62 | 9,56 | 11,14 | 15,19 | -8,00 | 4,59 | -4,44 |
| 12 | 2,25 | 5,37 | 9,31 | 18,61 | 13,91 | -10,00 | 3,74 | -2,19 |
| 13 | 2,08 | 5,37 | 9,5 | 17,23 | 15,2 | -10,00 | 4,26 | -3,66 |
| 14 | 2 | 5,31 | 8,06 | 10,29 | 15,91 | -10,00 | 5,57 | -0,56 |
| 15 | 2,14 | 5,24 | 7,66 | 10,47 | 15,16 | -12,00 | 5,67 | -1,74 |
| 16 | 2,03 | 5,05 | 8,92 | 17,83 | 16,18 | -12,00 | 4,14 | -2,55 |
| 17 | 1,89 | 4,97 | 9,34 | 15,28 | 17,66 | -12,00 | 4,17 | -5,12 |

FIG_6

| N° | $S_{eff}$ µm² @1495nm | C ps/nm.km @1495nm | C' ps/nm².km @1495nm | C/C' nm @1495nm | Taux de compensation TeraLight Ultra (%) | Taux de compensation TeraLight (%) | $\lambda_{ch}$ µm | $PC_{1530}$ dB/m |
|---|---|---|---|---|---|---|---|---|
| 10 | 20 | -19,6 | -0,171 | 115 | 116 | 139 | 1,73 | 1,6 |
| 11 | 19 | -28,8 | -0,244 | 118 | 119 | 142 | 1,72 | 3,6 |
| 12 | 19 | -9,2 | -0,091 | 102 | 103 | 123 | 1,51 | 0,1 |
| 13 | 18 | -19,1 | -0,173 | 111 | 112 | 134 | 1,60 | 0,2 |
| 14 | 17 | -29,1 | -0,271 | 108 | 109 | 130 | 1,72 | 2,7 |
| 15 | 17 | -10,1 | -0,099 | 102 | 103 | 123 | 1,50 | 0,6 |
| 16 | 16 | -18,9 | -0,18 | 105 | 106 | 127 | 1,53 | 0,1 |
| 17 | 15 | -29,1 | -0,269 | 108 | 109 | 130 | 1,56 | 0,2 |

FIG_7

| N | $S_{01}$ ($10^3$ µm) | $T_{01}$ ($10^3$ µm²) | $S_{12}$ ($10^3$ µm) | $T_{12}$ ($10^3$ µm²) | $S_{23}$ ($10^3$ µm) | $T_{23}$ ($10^3$ µm²) | $S_{34}$ ($10^3$ µm) | $S_{04}$ ($10^3$ µm) | $T_{04}$ ($10^3$ µm²) | $U_{04}$ ($10^3$ µm²) | $U_{24}$ ($10^3$ µm²) |
|---|---|---|---|---|---|---|---|---|---|---|---|
| MIN | 28,4 | 49 | -56 | -470 | 5 | 60 | -153 | -138 |  | 24,1 | 9,8 |
| MAX | 35,5 | 81 | -20 | -130 | 26 | 440 | 0 | 22 | 80 | 28,3 | 42,6 |
| 10 | 29,8 | 62,8 | -31,5 | -274,7 | 22,2 | 363,7 | -18,6 | -38,8 | -260,2 | 25,8 | 16,9 |
| 11 | 30,5 | 61,4 | -28,9 | -220,4 | 18,1 | 274,5 | -7,0 | -12,4 | -29,7 | 26,0 | 20,9 |
| 12 | 31,3 | 70,4 | -31,2 | -237,7 | 14,7 | 216,3 | -20,4 | -40,6 | -519,7 | 26,3 | 19,3 |
| 13 | 31,6 | 65,8 | -32,9 | -245,1 | 17,6 | 261,6 | -28,3 | -57,9 | -674,0 | 26,4 | 22,0 |
| 14 | 31,8 | 63,6 | -33,1 | -242,0 | 15,3 | 204,8 | -1,2 | -3,8 | 3,6 | 26,4 | 26,6 |
| 15 | 32,4 | 69,4 | -37,2 | -274,5 | 13,7 | 177,0 | -4,9 | -14,5 | -116,7 | 26,6 | 24,4 |
| 16 | 32,8 | 66,7 | -36,2 | -256,6 | 16,0 | 223,8 | -22,7 | -48,8 | -573,9 | 26,6 | 24,2 |
| 17 | 33,4 | 63,1 | -37,0 | -253,5 | 18,2 | 260,8 | -30,4 | -64,4 | -678,5 | 26,3 | 25,6 |

OPTICAL FIBER WITH CHROMATIC DISPERSION COMPENSATION IN THE S BAND

CROSS-REFERENCE TO RELATED APPLICATIONS

This application is based on French Patent Application No. 02 16 616 filed Dec. 24, 2002, the disclosure of which is hereby incorporated by reference thereto in its entirety, and the priority of which is hereby claimed under 35 U.S.C. §119.

BACKGROUND OF THE INVENTION

1. Field of the Invention

The invention relates to the field of optical fibers for wavelength division multiplex transmission networks.

2. Description of the Prior Art

Increasing information bit rates on this type of network impose compensation of chromatic dispersion and dispersion slope over bands of the spectrum other than the C band. The S band extends approximately from 1 460 nm to 1 530 nm. The C band extends approximately from 1 530 nm to 1 565 nm. The L band extends approximately from 1 565 nm to 1 625 nm. The U band extends approximately from 1 625 nm to 1 675 nm. The most widely used band is the C band. The invention relates to fibers with chromatic dispersion compensation in the S band.

In the prior art, it is known to combine certain types of dispersion shifted optical fibers reducing crossed non-linear effects, known as non-zero dispersion shifted fiber (NZ-DSF), with dispersion compensating fiber (DCF), thereby achieving a transmission line with no dispersion over a wide spectral range.

The patent application EP 1219986 discloses using an optical fiber with chromatic dispersion compensation in the S band, but the examples described with two or three slices either have a ratio between the attenuation at 1 520 nm and at 1 500 nm greater than two or a chromatic dispersion to dispersion slope ratio that renders them unsuited to the object of the invention.

The invention proposes a chromatic dispersion compensating optical fiber which, either because of profiles with at least four slices or because of profiles with three slices having structures corresponding to particular ranges of index and radius, provides effective compensation in the S band of the chromatic dispersion of a certain range of line optical fibers, combined with attenuations at 1 500 nm and at 1 520 nm that are comparable. A particularly advantageous aspect is the very deeply buried nature of the index of the first buried slice (or of the only buried slice if there is only one) relative to the index of the central slice.

SUMMARY OF THE INVENTION

The invention provides an optical fiber with compensation of chromatic dispersion in the S band from 1 460 nm to 1 530 nm, for use in wavelength division multiplex transmission networks, having a negative chromatic dispersion at the wavelength of 1 495 nm, comprising successively from the center toward the periphery a core having a varying index profile and then a cladding of constant index, said varying index profile of said core comprising successively, from said center toward said periphery, a central slice having a maximum index higher than the index of said cladding, a buried slice having a minimum index lower than the index of said cladding, and an annular slice having a maximum index higher than the index of said cladding and lower than the maximum index of said central slice, the difference $\Delta n_1$ between said maximum index of said central slice and the index of said cladding being from $11.5 \times 10^{-3}$ to $20.0 \times 10^{-3}$, the radius $r_1$ of the portion of said central slice having an index higher than the index of said cladding being from 1.6 µm to 2.6 µm, the value $S_{01}$ of the integral $$\int_0^{rl} \Delta n(r) \cdot dr$$

between a zero radius and the radius of the portion of said central slice having an index higher than the index of said cladding of the index difference relative to said cladding being from $28 \times 10^{-3}$ µm to $34 \times 10^{-3}$ µm, and the radii and the indices of each of said slices being determined so that said dispersion compensating optical fiber has at the wavelength of 1 495 nm a chromatic dispersion to dispersion slope ratio whose absolute value is from 68 nm to 158 nm.

The radii and the indices of each slice are preferably determined so that said dispersion compensating optical fiber has at the wavelength of 1 495 nm a chromatic dispersion to chromatic dispersion slope ratio whose absolute value is from 80 nm to 118 nm. The radii and the indices of each slice are advantageously determined so that said dispersion compensating optical fiber has at the wavelength of 1 495 nm a chromatic dispersion to chromatic dispersion slope ratio whose absolute value is from 87 nm to 105 nm.

The invention also provides an optical fiber with compensation of chromatic dispersion in the S band from 1 460 nm to 1 530 nm, for use in wavelength division multiplex transmission networks, having a negative chromatic dispersion at the wavelength of 1 495 nm, comprising successively from the center toward the periphery a core having a varying index profile and then a cladding of constant index, said varying index profile of said core comprising successively, from said center toward said periphery, a central slice having a maximum index higher than the index of said cladding, a first buried slice having a minimum index lower than the index of said cladding, an annular slice having a maximum index higher than the index of said cladding and lower than the maximum index of said central slice, a second buried slice having a minimum index lower than the index of said cladding, the radii and the indices of each of said slices being determined so that said dispersion compensating optical fiber has at the wavelength of 1 495 nm a chromatic dispersion to chromatic dispersion slope ratio whose absolute value is from 68 nm to 158 nm.

The radii and the indices of each slice are preferably determined so that said dispersion compensating optical fiber has at the wavelength of 1 495 nm a chromatic dispersion to chromatic dispersion slope ratio whose absolute value is from 80 nm to 118 nm. The radii and the indices of each slice are advantageously determined so that said dispersion compensating optical fiber has at the wavelength of 1 495 nm a chromatic dispersion to chromatic dispersion slope whose absolute value is from 87 nm to 105 nm.

The invention further provides an optical fiber with compensation of chromatic dispersion in the S band from 1 460 nm to 1 530 nm, for use in wavelength division multiplex transmission networks, having a negative chromatic dispersion at the wavelength of 1 495 nm, comprising successively from the center toward the periphery a core having a varying index profile and then a cladding of constant index, said varying index profile of said core comprising successively, from said center toward said periphery, a central slice having a maximum index higher than the index of said cladding, a buried slice having a minimum index lower than the index of said cladding, and an annular slice having a maximum index higher than the index of said cladding and lower than the maximum index of said central slice, the absolute value of the minimum index of said buried slice being greater than or equal to 60% of the absolute value of the maximum index of said central slice. The depth to which is buried this slice that is very deeply buried relative to the height of the central slice is an important advantageous feature that facilitates obtaining good compensation in the S band not only of chromatic dispersion but also of dispersion slope, without significantly degrading the other properties of the chromatic dispersion compensating optical fiber. The absolute value of the minimum index of said buried slice is preferably greater than or equal to 90% of the absolute value of the maximum index of said central slice.

Other advantageous features with the same aim are described next.

The varying index profile of said core preferably comprises successively, from said center toward said periphery, a central slice having a maximum index higher than the index of said cladding, a first buried slice having a minimum index lower than the index of said cladding, an annular slice having a maximum index higher than the index of said cladding and lower than the maximum index of said central slice, and a second buried slice having an index lower than the index of said cladding. This is therefore an index profile comprising at least four slices.

The radii and the indices of each slice are preferably determined so that said dispersion compensating optical fiber has at the wavelength of 1 495 nm a chromatic dispersion to chromatic dispersion slope ratio whose absolute value is from 68 nm to 158 nm.

The dispersion compensating optical fiber according to the invention is associated with a line optical fiber in an optical fiber transmission system. In one embodiment, the optical fiber transmission system comprises the combination of a line optical fiber and an in-line dispersion compensating optical fiber according to the invention. In another embodiment the optical fiber transmission system comprises the combination of a line optical fiber and an in-module dispersion compensating optical fiber according to the invention.

In a first preferred embodiment of the invention, the chromatic dispersion compensating optical fiber according to the invention comprises a type of varying core index profile with three slices. This type of core varying index profile comprises successively, from said center toward said periphery, a central slice having a maximum index higher than the index of said cladding, a buried slice having a minimum index lower than the index of said cladding, and an annular slice having a maximum index higher than the index of said cladding and lower than the maximum index of said central slice. The central slice is preferably rectangular but can also be trapezium-shaped, triangular or alpha-shaped for example. The other slices are preferably rectangular but can also be trapezium-shaped, triangle or alpha-shaped, for example.

A certain number of ranges or of preferred relations, in particular for the indices and the radii of the type of core index profile with three slices are described next that improve the quality of chromatic dispersion compensation in the S band of the line optical fiber and the other properties of the chromatic dispersion compensating optical fiber according to the invention.

The value $T_{01}$ of twice the integral $$\int_0^{r1} \Delta n(r) \cdot r \cdot dr$$

between a zero radius and the radius $r_1$ of the portion of said central slice having an index higher than the index of said cladding of the product of the index difference relative to the cladding and the radius is preferably from $51 \times 10^{-3}$ μm$^2$ to $79 \times 10^{-3}$ μm$^2$.

The difference $\Delta n_2$ between the minimum index of said buried slice and the index of said cladding is preferably from $-10 \times 10^{-3}$ to $-7.0 \times 10^{-3}$ and the outside radius $r_2$ of said buried slice is from 4.5 μm to 6.5 μm.

The value $S_{12}$ of the integral $$\int_{r1}^{r2} \Delta n(r) \cdot dr$$

between the radius $r_1$ of the portion of said central slice having an index higher than the index of said cladding and the radius $r_2$ of the portion of said buried slice having an index lower than the index of said cladding of the index difference relative to said cladding is preferably from $-42 \times 10^{-3}$ to $-22 \times 10^{-3}$ μm.

The value $T_{12}$ of twice the integral $$\int_{r1}^{r2} \Delta n(r) \cdot r \cdot dr$$

between the radius $r_1$ of the portion of said central slice having an index higher than the index of said cladding and the radius $r_2$ of the portion of said buried slice having an index lower than the index of said cladding of the product of the radius by the index difference relative to said cladding is preferably from $-350 \times 10^{-3}$ to $-160 \times 10^{-3}$ μm$^2$.

The difference between the maximum index of said annular slice and the index of said cladding is preferably from $1.0 \times 10^{-3}$ to $8.0 \times 10^{-3}$ and the outside radius of said annular slice is preferably from 7.3 μm to 10.2 μm.

The value $S_{23}$ of the integral $$\int_{r2}^{r3} \Delta n(r) \cdot dr$$

between the radius $r_2$ of the portion of said buried slice having an index lower than the index of said cladding and the radius $r_3$ of the portion of said annular slice having an index higher than the index of said cladding of the index difference relative to said cladding is preferably from $5 \times 10^{-3}$ to $15 \times 10^{-3}$ μm.

The value $T_{23}$ of twice the integral $$\int_{r2}^{r3} \Delta n(r) \cdot r \cdot dr$$

between the radius $r_2$ of the portion of said buried slice having an index lower than the index of said cladding and the radius $r_3$ of the portion of said annular slice having an index higher than the index of said cladding of the product of the radius by the index difference relative to said cladding is preferably from $70 \times 10^{-3}$ to $207 \times 10^{-3}$ $\mu m^2$.

The value $S_{03}$ of the integral $$\int_{0}^{r3} \Delta n(r) \cdot dr$$

between a zero radius and the radius $r_3$ of the portion of said annular slice having an index higher than the index of said cladding of the index difference relative to said cladding is preferably from $2.8 \times 10^{-3}$ to $18.2 \times 10^{-3}$ $\mu m$.

The value $T_{03}$ of twice the integral $$\int_{0}^{r3} \Delta n(r) \cdot r \cdot dr$$

between a zero radius and the radius $r_3$ of the portion of said annular slice having an index higher than the index of said cladding of the product of the radius by the index difference relative to said cladding is preferably from $-108 \times 10^{-3}$ to $57 \times 10^{-3}$ $\mu m^2$.

The value $U_{03}$ of twice the integral $$\int_{0}^{r3} \Delta n(r) \cdot \exp\left(\frac{-r^2}{a^2}\right) \cdot r \cdot dr$$

between a zero radius and the radius $r_3$ of the portion of said annular slice having an index higher than the index of said cladding of the product of the radius and the index difference relative to the cladding and the function $\exp(-r^2/a^2)$ where $a=1.58$ $\mu m$ is preferably from $24.4 \times 10^{-3}$ to $28.5 \times 10^{-3}$ $\mu m^2$.

In a second preferred embodiment of the invention, the chromatic dispersion compensating optical fiber according to the invention comprises a type of core varying index profile with four slices. The second type of core varying index profile comprises successively, from said center toward said periphery, a central slice having a maximum index higher than the index of said cladding, a first buried slice having a minimum index lower than the index of said cladding, an annular slice having a maximum index higher than the index of said cladding and lower than the maximum index of said central slice, and a second buried slice having a maximum index lower than the index of the cladding. The central slice is preferably rectangular, but can also be trapezium-shaped, triangle or alpha-shaped. The other slices are preferably rectangular, but can also be trapezium-shaped, triangle or alpha-shaped, for example.

A certain number of ranges or of preferred relations, in particular for the indices and the radii of the type of core index profile with four slices are described next that improve the quality of chromatic dispersion compensation in the S band of the line optical fiber and the other properties of the chromatic dispersion compensating optical fiber according to the invention.

The difference $\Delta n_1$ between the maximum index of said annular slice and the index of said cladding is preferably from $12 \times 10^{-3}$ to $20 \times 10^{-3}$ and the radius of the portion of said central slice having an index higher than the index of said cladding is from 1.57 $\mu m$ to 2.5 $\mu m$.

The value $S_{01}$ of the integral $$\int_{0}^{r1} \Delta n(r) \cdot dr$$

between a zero radius and the radius $r_1$ of the portion of said central slice having an index higher than the index of said cladding of the index difference relative to said cladding is preferably from $28.4 \times 10^{-3}$ $\mu m$ to $35.5 \times 10^{-3}$ $\mu m$.

The value $T_{01}$ of twice the integral $$\int_{0}^{r1} \Delta n(r) \cdot r \cdot dr$$

between a zero radius and the radius $r_1$ of the portion of said central slice having an index higher than the index of said cladding of the product of the index difference relative to the cladding and the radius is preferably from $49 \times 10^{-3}$ $\mu m^2$ to $81 \times 10^{-3}$ $\mu m^2$.

The difference between the minimum index of said first buried slice and the index of said cladding is from $-12 \times 10^{-3}$ to $-5 \times 10^{-3}$ and the outside radius of said first buried slice is preferably from 4.0 $\mu m$ to 7.4 $\mu m$.

The value $S_{12}$ of the integral $$\int_{r1}^{r2} \Delta n(r) \cdot dr$$

between the radius $r_1$ of the portion of said central slice having an index higher than the index of said cladding and the radius $r_2$ of the portion of said first buried slice having an index lower than the index of said cladding of the index difference relative to said cladding is preferably from $-56 \times 10^{-3}$ to $-20 \times 10^{-3}$ $\mu m$.

The value $T_{12}$ of twice the integral $$\int_{r1}^{r2} \Delta n(r) \cdot r \cdot dr$$

between the radius $r_1$ of the portion of said central slice having an index higher than the index of said cladding and the radius $r_2$ of the portion of said first buried slice having an index lower than the index of said cladding of the product of the radius by the index difference relative to said cladding is preferably from $-470 \times 10^{-3}$ to $-130 \times 10^{-3}$ $\mu m^2$.

The difference ($\Delta n3$) between the maximum index of said annular slice and the index of said cladding is preferably from $1.0 \times 10^{-3}$ to $8.0 \times 10^{-3}$ and the outside radius of said annular slice is preferably from 6.8 µm to 12 µm.

The value $S_{23}$ of the integral $$\int_{r2}^{r3} \Delta n(r) \cdot dr$$

between the radius $r_2$ of the portion of said first buried slice having an index lower than the index of said cladding and the radius $r_3$ of the portion of said annular slice having an index higher than the index of said cladding of the index difference relative to said cladding is preferably from $5 \times 10^{-3}$ to $26 \times 10^{-3}$ µm.

The value $T_{23}$ of twice the integral $$\int_{r2}^{r3} \Delta n(r) \cdot r \cdot dr$$

between the radius $r_2$ of the portion of said first buried slice having an index lower than the index of said cladding and the radius $r_3$ of the portion of said annular slice having an index higher than the index of said cladding of the product of the radius by the index difference relative to said cladding is preferably from $60 \times 10^{-3}$ to $440 \times 10^{-3}$ µm².

The difference $\Delta n_4$ between the minimum index of said second buried slice and the index of said cladding is preferably from $-12 \times 10^{-3}$ to 0 and the outside radius of said second buried slice is from 9 µm to 21 µm.

The value $S_{34}$ of the integral $$\int_{r3}^{r4} \Delta n(r) \cdot dr$$

between the radius $r_4$ of the portion of said annular slice having an index higher than the index of said cladding and the radius of the portion of said second buried slice having an index lower than the index of said cladding of the index difference relative to said cladding is preferably from $-153 \times 10^{-3}$ µm to 0.

The value $S_{04}$ of the integral $$\int_{0}^{r4} \Delta n(r) \cdot dr$$

between a zero radius $r_4$ and the radius of the portion of said second buried slice having an index lower than the index of said cladding of the index difference relative to said cladding is preferably from $-138 \times 10^{-3}$ to $22 \times 10^{-3}$ µm.

The value $T_{04}$ of twice the integral $$\int_{0}^{r4} \Delta n(r) \cdot r \cdot dr$$

between a zero radius and the radius $r_4$ of the portion of said second buried slice having an index lower than the index of said cladding of the product of the radius by the index difference relative to said cladding is preferably less than or equal to $80 \times 10^{-3}$ µm².

The value $U_{04}$ of twice the integral $$\int_{0}^{r4} \Delta n(r) \cdot \exp\left(\frac{-r^2}{b^2}\right) \cdot r \cdot dr$$

between a zero radius and the radius $r_4$ of the portion of said second buried slice having an index lower than the index of said cladding of the product of the radius and the index difference relative to said cladding and the function $\exp(-r^2/b^2)$ where $b = 1.54$ µm is preferably from $24.1 \times 10^{-3}$ to $28.3 \times 10^{-3}$ µm².

The value $U_{24}$ of twice the integral $$\int_{r2}^{r4} \Delta n(r) \cdot \exp\left(\frac{-r^2}{c^2}\right) \cdot r \cdot dr$$

between the radius $r_2$ of the portion of said first buried slice having an index higher than the index of said cladding and the radius $r_4$ of the portion of said second buried slice having an index lower than the index of said cladding of the product of the radius and the index difference relative to the cladding and the function $\exp(-r^2/c^2)$ where $c = 4.67$ µm is preferably from $9.8 \times 10^{-3}$ to $42.6 \times 10^{-3}$ µm².

The invention will be better understood and other features and advantages will become apparent in the light of the following description and the appended drawings, which are provided by way of example.

BRIEF DESCRIPTION OF THE DRAWINGS

FIG. 1 represents diagrammatically one example of a type of profile with four slices of a chromatic dispersion compensating optical fiber according to the invention.

FIG. 2 is a table comprising radius and index difference values for nine examples of profiles with three slices of a chromatic dispersion compensating optical fiber according to the invention.

FIG. 3 is a table comprising certain characteristics of the profiles of a chromatic dispersion compensating optical fiber according to the invention as defined in FIG. 2.

FIG. 4 is a table comprising other characteristics of the profiles of a chromatic dispersion compensating optical fiber according to the invention as defined in FIG. 2.

FIG. 5 is a table comprising radius and index difference values for eight examples of profiles with four slices of a chromatic dispersion compensating optical fiber according to the invention.

FIG. 6 is a table comprising certain characteristics of the profile of a chromatic dispersion compensating optical fiber according to the invention as defined in FIG. 5.

FIG. 7 is a table comprising other characteristics of the profiles of a chromatic dispersion compensating optical fiber according to the invention as defined in FIG. 5.

DETAILED DESCRIPTION OF THE PREFERRED EMBODIMENTS

FIG. 1 shows diagrammatically one example of a type of profile with four slices of a chromatic dispersion compensating optical fiber according to the invention. The first slice, or central slice as it is otherwise known, has a maximum index difference $\Delta n1$ relative to the constant index of the cladding and an outside radius r1. The maximum index difference $\Delta n1$ is positive. The index is preferably constant between a zero radius and the radius r1. The second slice, or first buried slice as it is otherwise known, has a maximum index difference $\Delta n2$ relative to the constant index of the cladding and an outside radius r2. The maximum index difference $\Delta n2$ is negative. The index is preferably constant between the radius r1 and the radius r2. The third slice, or annular slice as it is otherwise known, has a maximum index difference $\Delta n3$ relative to the constant index of the cladding and an outside radius r3. The maximum index difference $\Delta n3$ is positive. The index is preferably constant between the radius r2 and the radius r3. The fourth slice, or second buried slice as it is otherwise known, has a maximum index difference $\Delta n4$ relative to the constant index of the cladding and an outside radius r4. The maximum index difference $\Delta n4$ is negative. The index is preferably constant between the radius r3 and the radius r4. Beyond the radius r4 is the constant index cladding.

FIG. 1 also corresponds to an example of a type of profile with three slices of a chromatic dispersion compensating optical fiber according to the invention for which $\Delta n4=0$ and r4=r3. In this case, the second buried slice does not exist and the first buried slice is simply referred to as the buried slice.

FIG. 2 is a table comprising radius and index difference values for nine examples of profiles with three slices of a chromatic dispersion compensating optical fiber according to the invention. The left-hand column gives the number of the example from 1 to 9. The next three columns give in µm the radii of the core varying index profile. The last three columns give one thousand times the index differences (no units).

FIG. 3 is a table comprising certain characteristics of the profiles of a chromatic dispersion compensating optical fiber according to the invention as defined in FIG. 2. The left-hand column gives the number of the example from 1 to 9. For each example considered, the other columns give characteristics of the optical fiber corresponding to the example concerned. The next column gives the effective area $S_{eff}$ expressed in $\mu m^2$ at the wavelength of 1 495 nm. The next column gives the chromatic dispersion C expressed in ps/nm.km at a wavelength of 1 495 nm. The next column gives the dispersion slope C' expressed in ps/nm$^2$.km at a wavelength of 1 495 nm. The next column gives the chromatic dispersion C to dispersion slope C' ratio expressed in nm at a wavelength of 1 495 nm. The next column gives the compensation in percent for the line optical fiber sold under the trademark "TERALIGHT ULTRA". The next column gives the compensation in percent for the line optical fiber sold under the Trade Mark "TERALIGHT". The next column gives the theoretical cut-off wavelength $\lambda_{cth}$ expressed in nm. The last column gives the bending losses expressed in dB/m at the wavelength of 1 530 nm for winding to a radius of 10 mm.

FIG. 4 is a table comprising other characteristics of the profiles of a chromatic dispersion compensating optical fiber according to the invention as defined in FIG. 2. The left-hand column gives the numbers of the examples from 1 to 9. For each example considered, the other columns give characteristics of the optical fiber corresponding to the example concerned. The left-hand column also has entries MIN and MAX corresponding in the subsequent columns to a preferred minimum and a preferred maximum, respectively, for the value of the characteristic concerned. In each column, the first row comprising a numerical value corresponds to a preferred minimum value, the second row comprising a numerical value corresponds to a preferred maximum value, and the subsequent rows comprising numerical values correspond to real values for examples 1 to 9. The next column gives the value of $S_{01}$ expressed in thousandths of µm. The next column gives the value of $T_{01}$ expressed in thousandths of $\mu m^2$. The next column gives the value of $S_{12}$ expressed in thousandths of µm. The next column gives the value of $T_{12}$ expressed in thousandths of $\mu m^2$. The next column gives the value of $S_{23}$ expressed in thousandths of µm. The next column gives the value of $T_{23}$ expressed in thousandths of $\mu m^2$. The next column gives the value of $S_{03}$ expressed in thousandths of µm. The next column gives the value of $T_{03}$ expressed in thousandths of $\mu m^2$. The last column gives the value of $U_{03}$ expressed in thousandths of $\mu m^2$.

FIG. 5 is a table comprising the radius and index difference values for nine examples of profiles with four slices of a chromatic dispersion compensating optical fiber according to the invention. The left-hand column gives the numbers of the examples from 10 to 17. The next four columns give in µm the radii of the core varying index profile. The last four columns give one thousand times the index differences (no units).

FIG. 6 is a table comprising certain characteristics of the profiles of a chromatic dispersion compensating optical fiber according to the invention as defined in FIG. 5. Its description is analogous to that of FIG. 3.

FIG. 7 is a table comprising other characteristics of the profiles of a chromatic dispersion compensating optical fiber according to the invention as defined in FIG. 5. Its description is analogous to that of FIG. 4.

The invention claimed is:

1. An optical fiber with compensation of chromatic dispersion in the S band from 1 460 nm to 1 530 nm, for use in wavelength division multiplex transmission networks, having a negative chromatic dispersion at the wavelength of 1 495 nm, comprising successively from the center toward the periphery a core having a varying index profile and then a cladding of constant index, said varying index profile of said core comprising successively, from said center toward said periphery, a central slice having a maximum index higher than the index of said cladding, a first buried slice having a minimum index lower than the index of said cladding, an annular slice having a maximum index higher than the index of said cladding and lower than the maximum index of said central slice, a second buried slice having a minimum index lower than the index of said cladding, radii and the indices of each of said slices being determined so that said dispersion compensating optical fiber has at the wavelength of 1 495 nm a chromatic dispersion to dispersion slope ratio whose absolute value is from 68 nm to 158 nm.

2. The optical fiber claimed in claim 1 wherein the radii and the indices of each slice are determined so that said dispersion compensating optical fiber has at the wavelength of 1 495 nm a chromatic dispersion to chromatic dispersion slope ratio whose absolute value is from 80 nm to 118 nm.

3. The optical fiber claimed in claim 2 wherein the radii and the indices of each slice are determined so that said dispersion compensating optical fiber has at the wavelength of 1 495 nm a chromatic dispersion to chromatic dispersion slope ratio whose absolute value is from 87 nm to 105 nm.

4. The optical fiber claimed in claim 1 wherein the difference between the maximum index of said annular slice and the index of said cladding is from $12 \times 10^{-3}$ to $20 \times 10^{-3}$ and the radius of the portion of said central slice having an index higher than the index of said cladding is from 1.57 μm to 2.5 μm.

5. The optical fiber claimed in claim 4 wherein the value of the integral between a zero radius and the radius of the portion of said central slice having an index higher than the index of said cladding of the index difference relative to said cladding is from $28.4 \times 10^{-3}$ μm to $35.5 \times 10^{-3}$ μm.

6. The optical fiber claimed in claim 5 wherein the value of twice the integral between a zero radius and the radius of the portion of said central slice having an index higher than the index of said cladding of the product of the index difference relative to the cladding and the radius is from $49 \times 10^{-3}$ μm² to $81 \times 10^{-3}$ μm².

7. The optical fiber claimed in claim 1 wherein the difference between the minimum index of said first buried slice and the index of said cladding is from $-12 \times 10^{-3}$ to $-5 \times 10^{-3}$ and the outside radius of said first buried slice is from 4.0 μm to 7.4 μm.

8. The optical fiber claimed in claim 7 wherein the value of the integral between the radius of the portion of said central slice having an index higher than the index of said cladding and the radius of the portion of said first buried slice having an index lower than the index of said cladding of the index difference relative to said cladding is from $-56 \times 10^{-3}$ to $-20 \times 10^{-3}$ μm.

9. The optical fiber claimed in claim 8 wherein the value of twice the integral between the radius of the portion of said central slice having an index higher than the index of said cladding and the radius of the portion of said first buried slice having an index lower than the index of said cladding of the product of the radius by the index difference relative to said cladding is from $-470 \times 10^{-3}$ to $-130 \times 10^{-3}$ μm².

10. The optical fiber claimed in claim 1 wherein the difference between the maximum index of said annular slice and the index of said cladding is from $1.0 \times 10^{-3}$ to $8.0 \times 10^{-3}$ and the outside radius of said annular slice is from 6.8 μm to 12 μm.

11. The optical fiber claimed in claim 10 wherein the value of the integral between the radius of the portion of said first buried slice having an index lower than the index of said cladding and the radius of the portion of said annular slice having an index higher than the index of said cladding of the index difference relative to said cladding is from $5 \times 10^{-3}$ to $26 \times 10^{-3}$ μm.

12. The optical fiber claimed in claim 11 wherein the value of twice the integral between the radius of the portion of said first buried slice having an index lower than the index of said cladding and the radius of the portion of said annular slice having an index higher than the index of said cladding of the product of the radius by the index difference relative to said cladding is from $60 \times 10^{-3}$ to $440 \times 10^{-3}$ μm².

13. The optical fiber claimed in claim 1 wherein the difference between the minimum index of said second buried slice and the index of said cladding is from $-12 \times 10^{-3}$ to 0 and the outside radius of said second buried slice is from 9 μm to 21 μm.

14. The optical fiber claimed in claim 13 wherein the value of the integral between the radius of the portion of said annular slice having an index higher than the index of said cladding and the radius of the portion of said second buried slice having an index lower than the index of said cladding of the index difference relative to said cladding is from $-153 \times 10^{-3}$ μm to 0.

15. The optical fiber claimed in claim 1 wherein the value of the integral between a zero radius and the radius of the portion of said second buried slice having an index lower than the index of said cladding of the index difference relative to said cladding is from $-138 \times 10^{-3}$ to $22 \times 10^{-3}$ μm.

16. The optical fiber claimed in claim 15 wherein the value of twice the integral between a zero radius and the radius of the portion of said second buried slice having an index lower than the index of said cladding of the product of the radius by the index difference relative to said cladding is less than or equal to $80 \times 10^{-3}$ μm².

17. The optical fiber claimed in claim 16 wherein the value of twice the integral between a zero radius and the radius of the portion of said second buried slice having an index lower than the index of said cladding of the product of the radius and the index difference relative to said cladding and the function $\exp(-r^2/b^2)$ where $b=1.54$ μm is from $24.1 \times 10^{-3}$ to $28.3 \times 10^{-3}$ m².

18. The optical fiber claimed in claim 1 wherein the value of twice the integral between the radius of the portion of said first buried slice having an index higher than the index of said cladding and the radius of the portion of said second buried slice having an index lower than the index of said cladding of the product of the radius and the index difference relative to the cladding and the function $\exp(-r\,2/c2)$ where $c=4.67$ μm is from $9.8 \times 10^{-3}$ to $42.6 \times 10^{-3}$ μm².

19. An optical fiber transmission system comprising the combination of a line optical fiber and an optical fiber with chromatic dispersion compensation in the S band according to claim 1, wherein said dispersion compensating optical fiber is an in-line fiber.

20. An optical fiber transmission system comprising the combination of a line optical fiber and an optical fiber with chromatic dispersion compensation in the S band according to claim 1, wherein said dispersion compensating optical fiber is an in-module fiber.

* * * * *